(12) United States Patent
Schober

(10) Patent No.: US 8,920,250 B2
(45) Date of Patent: Dec. 30, 2014

(54) MASS BALANCING UNIT

(75) Inventor: Michael Schober, Behamberg (AT)

(73) Assignee: MAGNA Powertrain AG & Co KG, Lannach (AT)

( * ) Notice: Subject to any disclaimer, the term of this patent is extended or adjusted under 35 U.S.C. 154(b) by 0 days.

(21) Appl. No.: 13/824,037

(22) PCT Filed: Sep. 20, 2011

(86) PCT No.: PCT/EP2011/004686
§ 371 (c)(1),
(2), (4) Date: Jun. 16, 2013

(87) PCT Pub. No.: WO2012/038057
PCT Pub. Date: Mar. 29, 2012

(65) Prior Publication Data
US 2013/0283965 A1    Oct. 31, 2013

(30) Foreign Application Priority Data
Sep. 21, 2010    (DE) .......... 10 2010 046 163

(51) Int. Cl.
*F16C 3/20*    (2006.01)
*F16F 15/26*    (2006.01)

(52) U.S. Cl.
CPC ............. *F16C 3/20* (2013.01); *F16F 15/268* (2013.01)

USPC ............................... 464/180; 384/569

(58) Field of Classification Search
USPC .......... 464/7, 127, 180; 384/474, 569, 581; 188/379, 380; 123/90.31, 90.6; 74/567, 74/574.2
See application file for complete search history.

(56) References Cited

U.S. PATENT DOCUMENTS

| 2,757,054 | A | * | 7/1956 | Van De Warker | 384/569 |
| 3,910,657 | A | * | 10/1975 | Dosne | 384/569 |
| 4,063,466 | A | * | 12/1977 | Showalter | 464/180 |
| 5,720,559 | A | * | 2/1998 | Mannsson et al. | 384/474 |
| 6,070,850 | A | * | 6/2000 | Lehman | 188/379 X |
| 2009/0044779 | A1 | | 2/2009 | Solfrank | |

* cited by examiner

*Primary Examiner* — Gregory Binda
(74) *Attorney, Agent, or Firm* — Jordan IP Law, LLC; Todd A. Vaughn

(57) ABSTRACT

A mass balancing unit having a hollow balancing shaft, at least one balancing weight which is provided on the balancing shaft and at least one roller bearing which has an outer bearing ring and a plurality of roller members. A longitudinal portion of the balancing shaft forms an inner bearing ring, the roller members being received between the outer bearing ring and the longitudinal portion of the balancing shaft. Adjacent to the longitudinal portion, the balancing shaft has at least one recess in order to reduce the rigidity of the longitudinal portion of the balancing shaft in a radial direction.

16 Claims, 5 Drawing Sheets

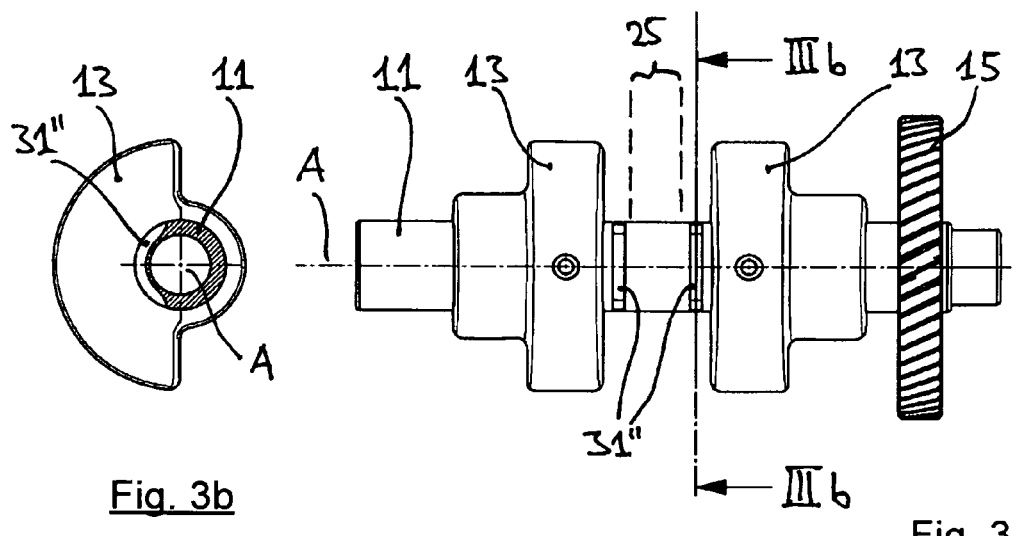
Fig. 3b
Fig. 3a
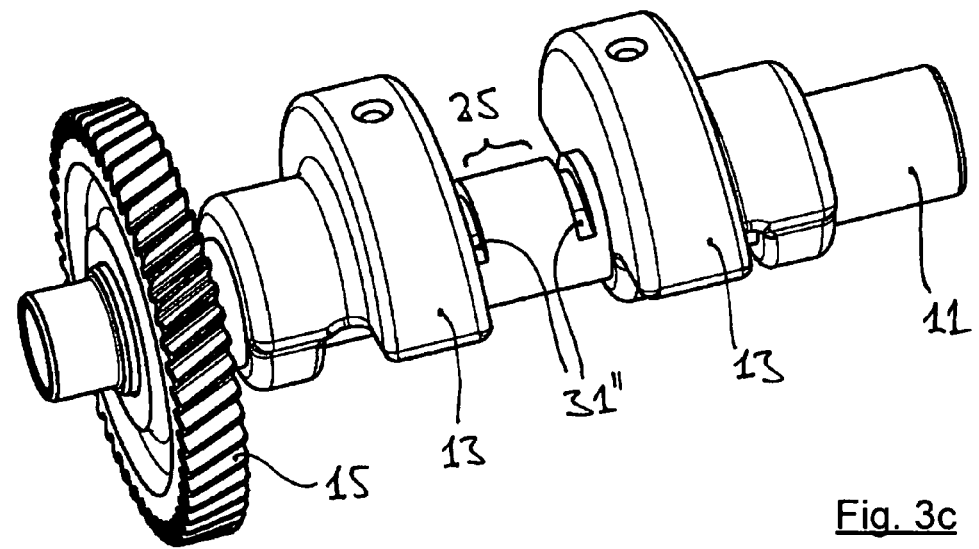
Fig. 3c

MASS BALANCING UNIT

CROSS-REFERENCE TO RELATED APPLICATIONS

The present application is a National Stage Application of PCT International Application No. PCT/PCT/EP2011/004686 (filed on Sep. 20, 2011), under 35 U.S.C. §371, which claims priority to German Patent Application No. DE 10 2010 046 163.6 (filed on Sep. 21, 2010), which are each hereby incorporated by reference in their complete respective entireties

TECHNICAL FIELD

The invention relates to a mass balancing unit having a hollow balancing shaft, at least one balancing weight which is provided on the balancing shaft and at least one roller bearing which has an outer bearing ring and a plurality of roller members, a longitudinal portion of the balancing shaft forming an inner bearing ring and the roller members being received between the outer bearing ring and the longitudinal portion of the balancing shaft.

BACKGROUND

A mass balancing unit having one or more balancing shafts has the purpose of compensating for the inertia forces and/or moments of inertia which typically occur in an internal combustion engine. To this end, at least one balancing weight is provided, in particular mounted in a rotationally secure manner, on the respective balancing shaft in order to form an unbalanced mass. The balancing shaft is drivingly connected to the crankshaft of the internal combustion engine, whereby the balancing shaft and the balancing weight which is provided thereon are caused to rotate. In specific engine types, for example, in in-line engines having four cylinders, such balancing shafts are used in pairs, the balancing shafts rotating in opposing directions. In other engine types, there is provided a single balancing shaft which has, for example, two balancing weights which are arranged in a diametrically opposed manner relative to each other but in an axially offset manner.

Owing to the use of roller bearings, particularly quiet running of the respective balancing shaft is achieved and high speeds can be reached. With an integral longitudinal portion of the balancing shaft forming an inner bearing ring of the roller bearing, the structure of the roller bearing is simplified. If the balancing shaft is hollow, it also has an advantageously low weight and moment of inertia.

Owing to the unbalanced mass brought about by the balancing weight, however, the balancing shaft and the bearings thereof are heavily loaded so that a correspondingly stable construction of the shaft and sizing of the bearings are required. However, this leads to a great weight and undesirably high costs for the mass balancing unit.

SUMMARY

An object of the invention is to provide a mass balancing unit of the type mentioned which enables a lighter and more cost-effective construction.

This object is achieved with a mass balancing unit having a hollow balancing shaft, at least one balancing weight which is provided on the balancing shaft and at least one roller bearing which has an outer bearing ring and a plurality of roller members, a longitudinal portion of the balancing shaft forming an inner bearing ring and the roller members being received between the outer bearing ring and the longitudinal portion of the balancing shaft, wherein the balancing shaft has, adjacent to the longitudinal portion, at least one recess in order to reduce the rigidity of the longitudinal portion of the balancing shaft in a radial direction.

The invention is based on the recognition that, with a conventional mass balancing unit, comparatively high point loads occur between the roller members and the inner bearing ring of the roller bearing, that is to say, the relevant longitudinal portion of the balancing shaft. These point loads are concentrated in a narrowly delimited peripheral angular range of the relevant longitudinal portion of the balancing shaft. This peripheral angular range is also referred to below as the load zone. The concentration of the radial forces which occur between the relevant longitudinal portion of the balancing shaft and the roller members on a load zone which is narrowly delimited in a peripheral direction results from the radial load of the shaft which is caused by the unbalanced mass (that is to say, by the balancing weight) rotating with the shaft. The construction of the balancing shaft and the sizing of the roller bearing must be selected in accordance with the mentioned point loads within the load zone.

In particular, the radial rigidity of the balancing shaft in the load zone of the said longitudinal portion can be increased by components which are secured to the balancing shaft in a state axially adjacent to this longitudinal portion (such as, for example, balancing weights, drive wheels, output wheels or other components) in comparison with a shaft without such secured components. The said longitudinal portion of the balancing shaft, owing to axially adjacent, non-rotationally-symmetrical components (such as, for example, balancing weights) may also be deformed in an oval manner in cross-section after being secured, which may again lead to a smaller load zone and may consequently cause even greater mechanical compression stresses between the roller members and the longitudinal portion of the balancing shaft that forms the inner bearing ring.

In the mass balancing unit in accordance with the invention, the balancing shaft comprises, in an axial direction adjacent to the longitudinal portion which forms the inner bearing ring, at least one recess. This recess serves to reduce the rigidity of the longitudinal portion of the balancing shaft that forms the inner bearing ring in a radial direction. That is to say, the at least one recess is arranged sufficiently close to the relevant longitudinal portion of the balancing shaft to increase the deformability of the load zone in a radial direction. The recess consequently brings about a decoupling between the longitudinal portion of the balancing shaft that forms the inner bearing ring, on the one hand, and the components which are secured to the balancing shaft in a state axially adjacent thereto and which bring about increased radial rigidity and/or ovalization of the mentioned longitudinal portion, on the other hand. A degree of resilience of the load zone in a radial direction makes it possible for the load zone to take up a larger peripheral angular range than without such a recess. Consequently, the number of roller members which abut in a non-positive-locking manner the balancing shaft which rotates in an unbalanced state is increased and the respective point load between the individual roller members and the relevant longitudinal portion of the balancing shaft is accordingly reduced. The mass balancing unit can consequently be configured in respect of smaller load peaks in the region of the respective roller bearing, whereby the weight and the costs are reduced.

Whenever directional indications are given in accordance with the invention (for example, axial or radial), these refer to the rotation axis of the balancing shaft.

Advantageous embodiments of the invention are set out below and in the dependent claims.

Generally, the at least one recess is arranged between the relevant longitudinal portion of the balancing shaft and the balancing weight, drive wheel, output wheel or other component secured to the balancing shaft, which balancing weight is provided in the vicinity of the roller bearing. The recess is preferably arranged adjacent to the longitudinal portion of the balancing shaft that forms the inner bearing ring of the roller bearing, that is to say, directly adjacent to the longitudinal portion. It is thereby possible to bring about the desired deformability of the said longitudinal portion of the balancing shaft in a particularly effective manner without the recess having to be of an excessively large size, whereby the flexural strength and the torsion strength of the balancing shaft would be impaired.

It is further preferable for the at least one recess to extend only over a limited peripheral angular range of the balancing shaft, that is to say, in accordance with the resulting load zone of the balancing shaft. Since only one radial load which acts on the balancing shaft and which rotates owing to the rotationally secure arrangement of the balancing weight with respect to the shaft must be compensated for, it is sufficient for the radial deformability of the balancing shaft over the said longitudinal portion to be limited to a limited peripheral angular range. Therefore, it is thereby possible for the stability of the balancing shaft overall not to be impaired.

For example, this limited peripheral angular range may have a value in a range between 90° and 180°.

The angular orientation of the said at least one recess or the said limited peripheral angular range preferably corresponds to the angular orientation of the balancing weight. That is to say, the recess or arrangement of a plurality of recesses with respect to their angular position on the balancing shaft is arranged in alignment with the balancing weight or the center of gravity of the balancing weight. It is thereby ensured that the desired resilient deformability of the relevant longitudinal portion of the balancing shaft is brought about over a peripheral angular range which corresponds to the said load zone.

With regard to the shaping of the said recess, this may be constructed, for example, as a slot which extends in the peripheral direction of the balancing shaft. In this instance, a single recess at the relevant end of the inner bearing ring or longitudinal portion of the balancing shaft is sufficient to adequately decrease the rigidity of the balancing shaft in the region of the roller bearing.

Alternatively, for example, it is possible to make provision for a plurality of holes which are arranged with spacing from each other or so as to be distributed in a state merging into each other in the peripheral direction of the output shaft.

The respective recess may be constructed as a through-opening (for example, slot or hole) in the wall of the hollow balancing shaft. Owing to such a complete breakthrough of the wall, the production of the balancing shaft can be simplified. Alternatively, however, the respective recess may also be constructed simply as a recess (for example, slot) in the surface of the balancing shaft, that is to say, without a breakthrough of the wall. A higher level of stability of the balancing shaft with respect to bending loading or torsion loading is thereby maintained.

The balancing shaft preferably comprises at least one recess at each of the two axial ends of the longitudinal portion which forms the inner bearing ring. Particularly uniform deformability of the relevant longitudinal portion of the balancing shaft is thereby achieved. However, it is also possible for one or more recesses to be provided at only one end of the relevant longitudinal portion of the balancing shaft, in particular when the relevant roller bearing is located at a longitudinal end of the balancing shaft. At least one recess may further also be provided within the relevant longitudinal portion of the balancing shaft in order to reduce the rigidity.

DRAWINGS

The invention will be explained below purely by way of example with reference to the drawings. Elements which are identical or of the same type are indicated with the same reference numerals. In the drawings:

FIG. 3a illustrates a bottom view of a balancing shaft in accordance with a third embodiment.

FIG. 3b illustrates a cross-sectional view in the plane IIIb-IIIb of FIG. 3a.

FIG. 3c illustrates a perspective view of the balancing shaft in accordance with the third embodiment, in a laterally oblique manner from below.

DESCRIPTION

Figure 1A:
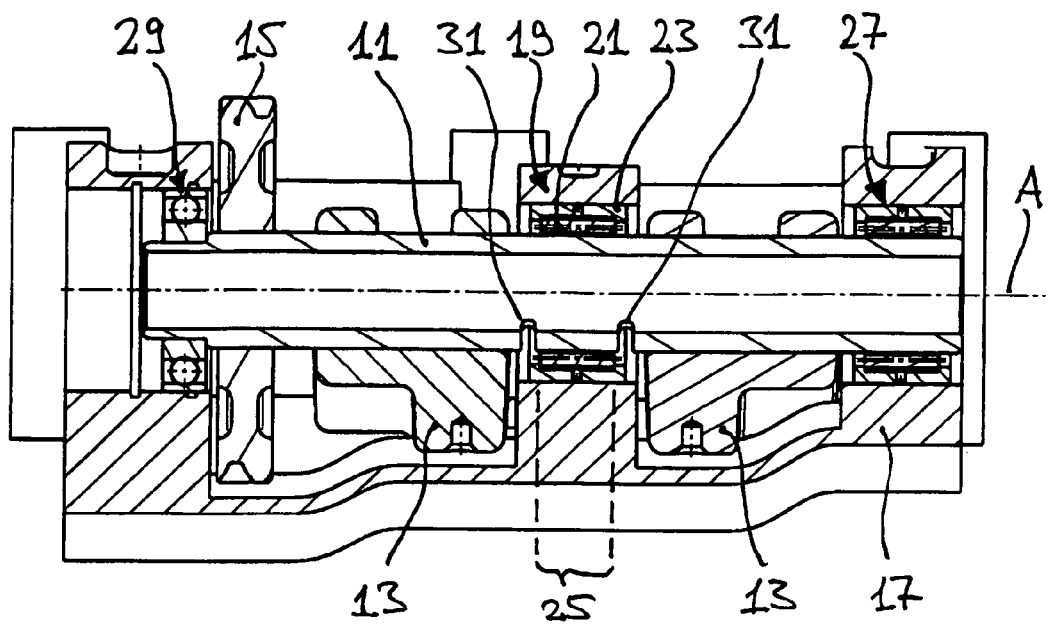
FIG. 1a illustrates a longitudinal sectioned view of a first embodiment of a mass balancing unit.
Figure 1B:
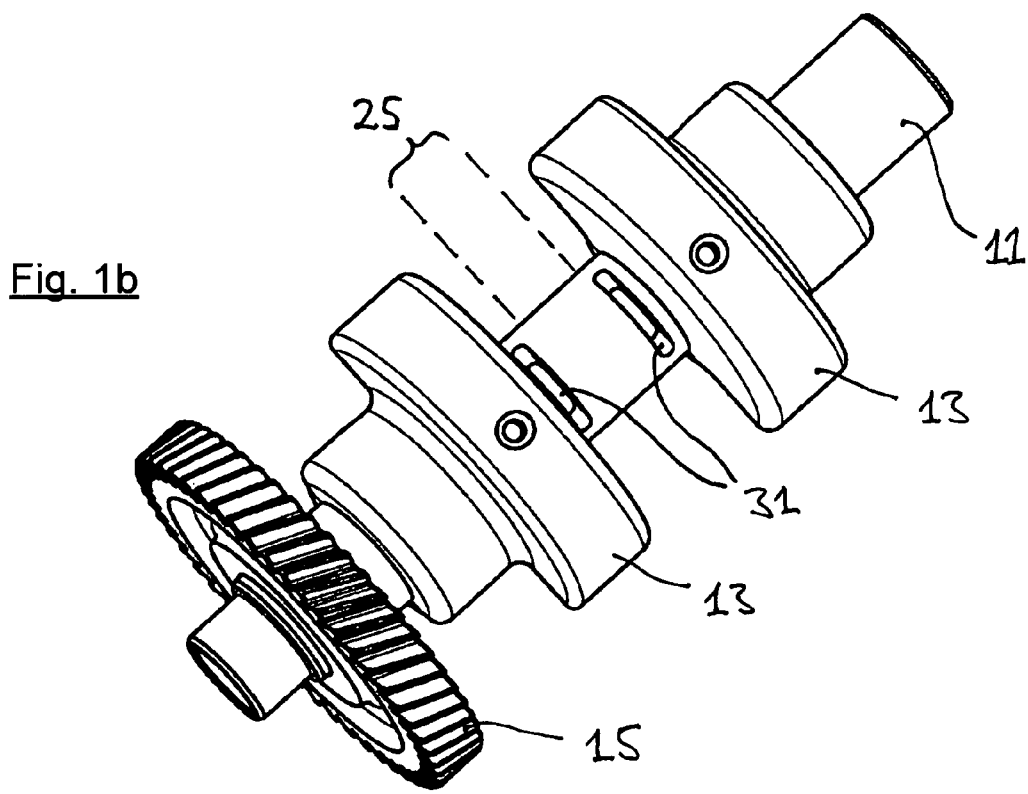
FIG. 1b illustrates a perspective view of the balancing shaft in accordance with the first embodiment from below.

The mass balancing unit illustrated in FIGS. 1a and 1b comprises a hollow, that is to say, tubular balancing shaft 11. Two balancing weights 13 are secured to the balancing shaft 11, for example, by way of a shrink-fitting connection, screwing, welding or bolting. In order to produce an unbalanced mass, the balancing weights 13 are substantially in the form of a semi-cylindrical segment having two curved retention members which are formed thereon, the angular orientation of one balancing weight 13 corresponding to the angular orientation of the other balancing weight 13 relative to the axis of rotation A of the balancing shaft 11. There is further secured to the balancing shaft 11 a drive wheel 15, for example, also by way of a shrink fitting connection. The drive wheel 15 can be drivingly connected directly to the crankshaft of an associated internal combustion engine in order to form a drive stage. Alternatively, the drive wheel 15 may be drivingly connected to a corresponding output wheel of a balancing shaft which is arranged in parallel in order to form a synchronizing stage.

The balancing shaft 11 is rotatably supported about the rotation axis A in a one-piece housing 17. To this end, there is provided between the two balancing weights 13 a roller bearing 19 which is constructed as a needle bearing. The roller bearing 19 comprises a plurality of roller members 21 which are arranged so as to be distributed in a peripheral direction and which, when constructed as a needle bearing, have an elongate cylindrical form. The roller members 21 are received between an outer bearing ring 23 of the roller bearing 19 and a longitudinal bearing portion 25 of the balancing shaft 11. The balancing shaft 11 consequently forms on the longitudinal bearing portion 25 an inner bearing ring for the roller bearing 19.

At the end of the balancing shaft 11 opposite the drive wheel 15 there is provided another roller bearing 27 which is also constructed as a needle bearing. Adjacent to the drive wheel 15 there is further provided a roller bearing 29 which is constructed as a ball bearing.

The mass balancing unit illustrated, in a manner known per se, serves to compensate for inertia forces occurring in the associated internal combustion engine. To this end, the unbalanced mass formed by the balancing weights 13 is caused to rotate synchronously with the crankshaft of the internal combustion engine by way of the drive wheel 15.

In accordance with the invention, the balancing shaft 11 comprises a recess 31 at each of the two ends of the longitudinal bearing portion 25. The respective recess 31 in the embodiment illustrated is arranged almost adjacent to the longitudinal bearing portion 25 and comprises a slot which extends over a limited peripheral angular range in the peripheral direction of the balancing shaft 11. The recess 31 (slot) forms in the embodiment of FIGS. 1a and 1b a breakthrough, that is to say, a through-opening, in the wall of the hollow balancing shaft 11.

The angular orientation of the two recesses 31 corresponds to the angular orientation of the two balancing weights 13, as illustrated in particular in FIG. 1b.

The two recesses 31 on the balancing shaft 11 bring about in particular a reduction of the radial rigidity of the longitudinal bearing portion 25, that is to say, of the inner bearing ring of the roller bearing 19 formed thereby. That is to say, the recesses 31 bring about a higher radial resilient deformability of the longitudinal bearing portion 25. The unbalanced state of the balancing weights 13 brings about on the balancing shaft 11 a radial load which is always concentrated, with respect to the roller bearing 19, on a limited peripheral angular range—the so-called load zone—whereby high point loads are produced between the roller members 21 and the longitudinal bearing portion 25 of the balancing shaft 11. Owing to the higher radial deformability of the longitudinal bearing portion 25 brought about by way of the recesses 31, the radial load of the balancing shaft 11 is ultimately distributed over a greater peripheral angular range, that is to say, the load zone is greater than one without any recesses 31 and the point loads which occur on the individual roller members 21 are reduced accordingly.

Figure 2A:
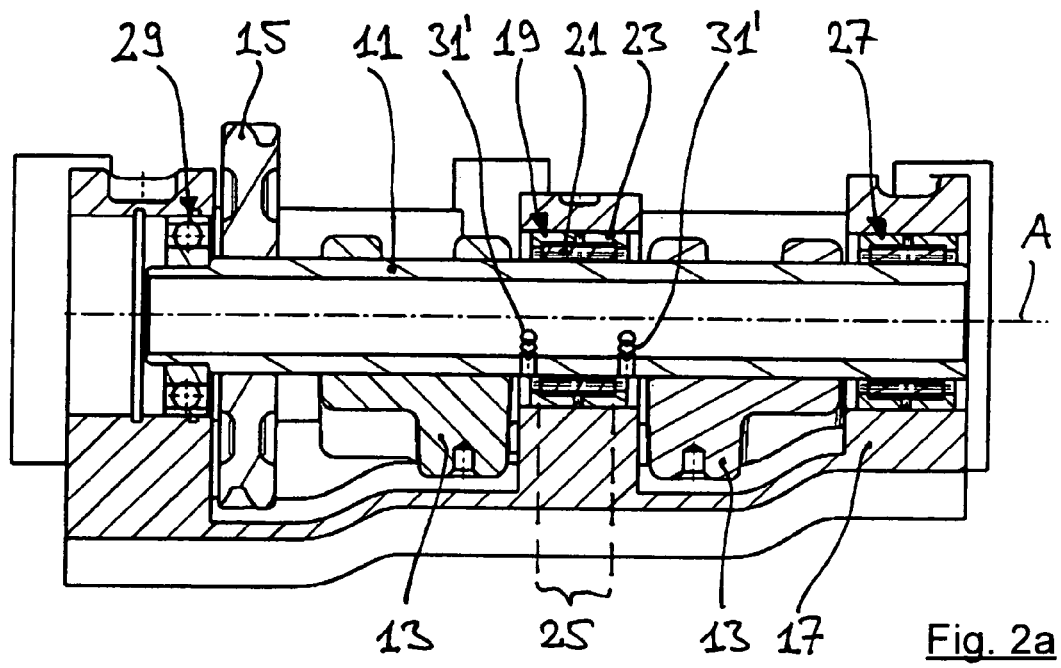
FIG. 2a illustrates a longitudinal sectioned view of a second embodiment of a mass balancing unit.
Figure 2B:
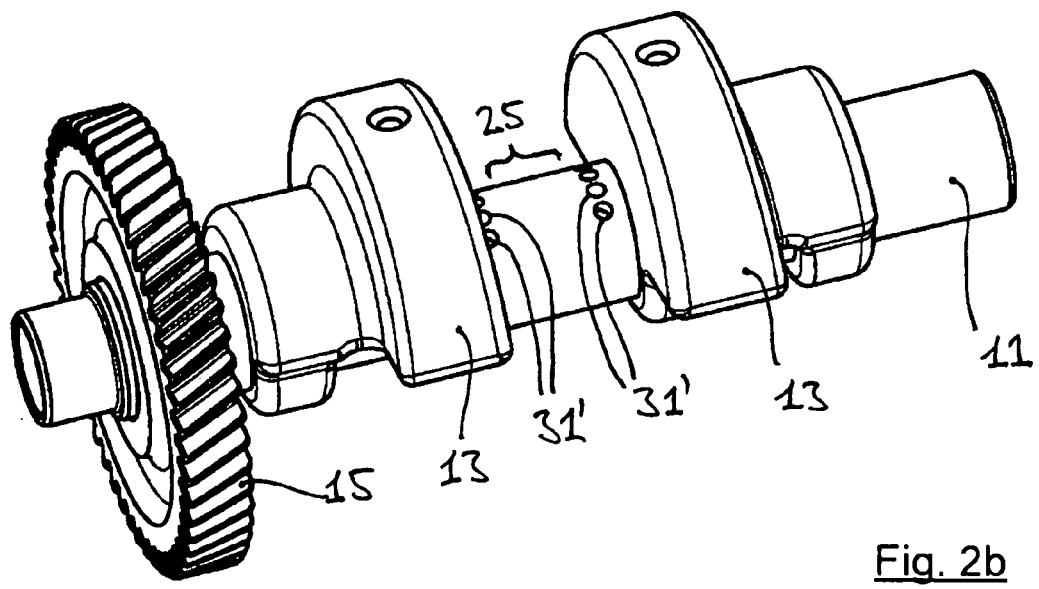
FIG. 2b illustrates a perspective view of the balancing shaft in accordance with the second embodiment, in a laterally oblique manner from below.
Figure 2C:
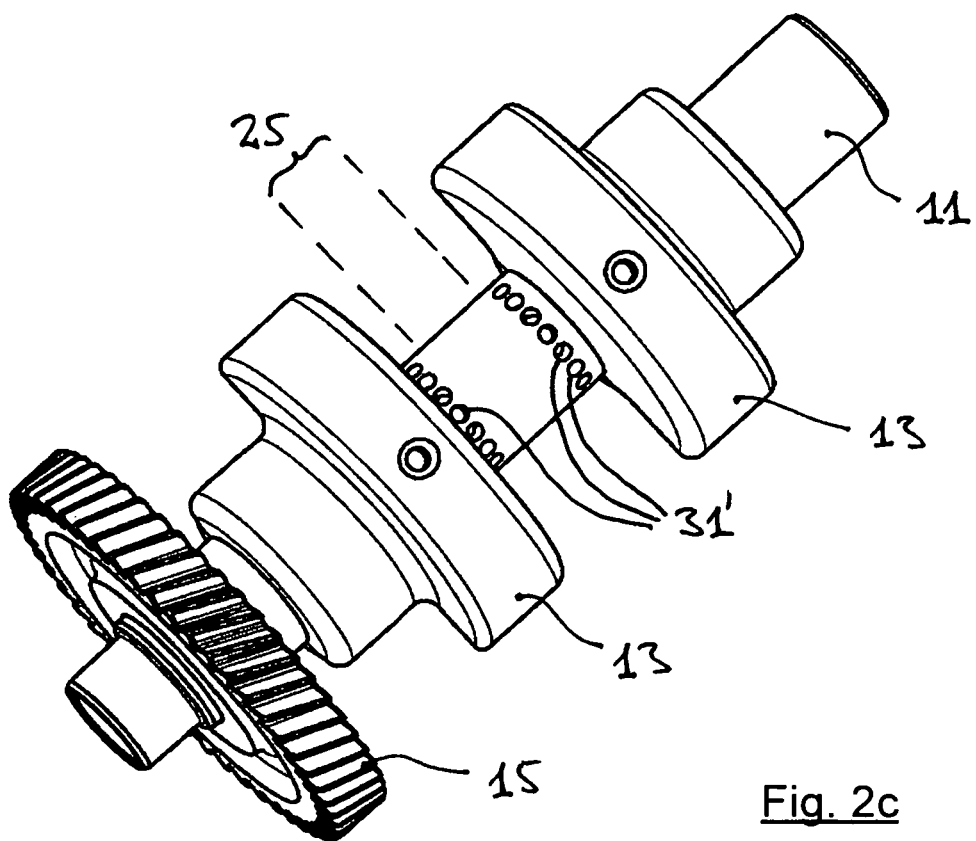
FIG. 2c illustrates a perspective view of the balancing shaft in accordance with the second embodiment from below.

The embodiment illustrated in FIGS. 2a to 2c has a very similar structure to that of FIGS. 1a and 1b. There is provided in this instance, however, at each of the two axial ends of the longitudinal bearing portion 25 an arrangement of a plurality of radial holes 31' which are distributed in a state spaced apart from each other in the peripheral direction of the balancing shaft 11. The holes 31' therefore form in this instance a respective recess which completely extends through the wall of the hollow balancing shaft 11.

As can be seen in FIG. 2c, the respective arrangement of a plurality of holes 31' extends over a slightly greater peripheral angular range than the slot-like recesses 31 of FIGS. 1a and 1b. The holes 31' of FIGS. 2a to 2c also bring about a reduction of the rigidity of the longitudinal bearing portion 25 of the balancing shaft 11.

The housing and the roller bearings of the mass balancing unit are not illustrated in FIGS. 3a to 3c. Furthermore, in this embodiment, the balancing shaft 11 again has a very similar structure to the embodiment of FIGS. 1a and 1b. In particular, the recesses 31" of FIGS. 3a to 3c also have a slotted form.

The recesses 31", however, do not form a through-opening in the wall of the balancing shaft 11 but instead only a recess in the surface of the balancing shaft 11. That is to say, when the slot-like recesses 31" are formed, a thin wall portion of the balancing shaft 11 is left behind, as can be seen in particular from the cross-sectional view in accordance with FIG. 3b. The resilient deformability of the longitudinal bearing portion 25 is still thereby increased to a given degree, but with the hollow balancing shaft 11 being weakened to a lesser extent with respect to a bending load or torsion load.

Figure 4A:
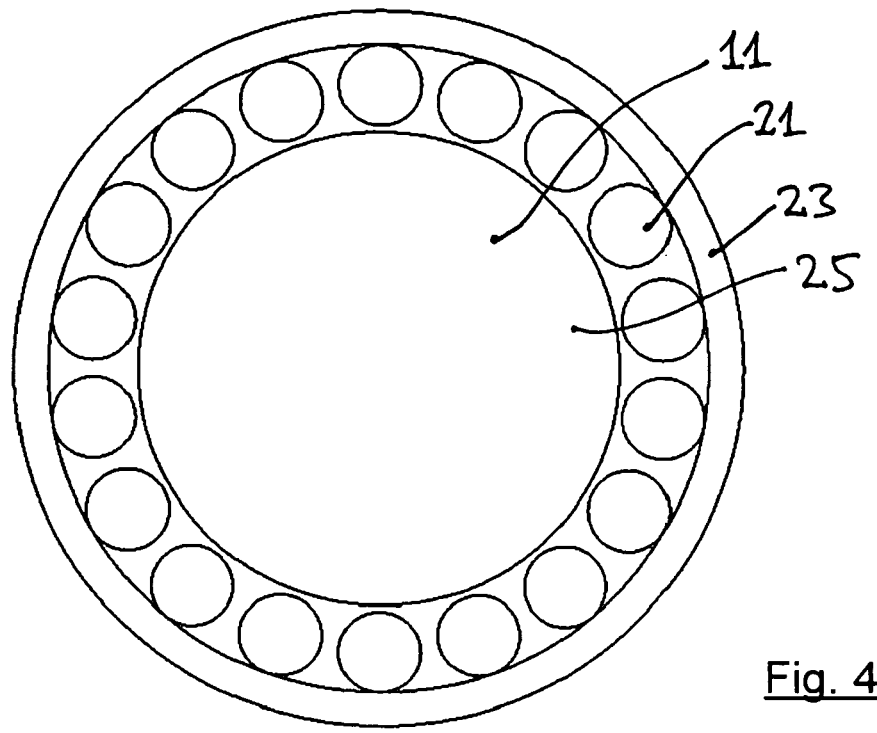
FIG. 4a illustrates a schematic cross-section of a conventional roller bearing in a non-loaded state.
Figure 4B:
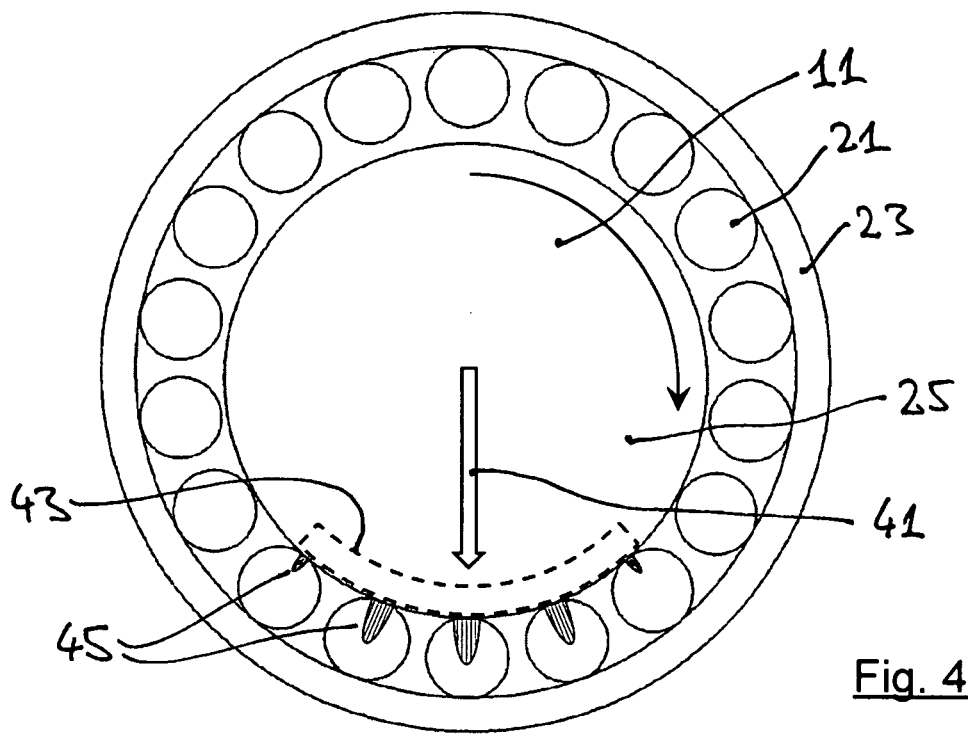
FIG. 4b illustrates a schematic cross-section of a conventional roller bearing in a loaded state.

FIGS. 4a and 4b illustrate the point loads which occur with a conventional roller bearing. FIG. 4a illustrates a roller bearing in the unloaded state. The balancing shaft 11 (illustrated here schematically as a solid shaft) is arranged with radial play concentrically with respect to the outer bearing ring 23 and the arrangement of the roller members 21.

If an unbalanced mass is active on the rotating balancing shaft 11, however, this becomes evident as a radial load 41 and, in accordance with this radial load 41, the balancing shaft 11 is arranged slightly eccentrically with respect to the outer bearing ring 23, as illustrated in FIG. 4b. The radial non-positive-locking engagement between the balancing shaft 11 and the outer bearing ring 23 is concentrated in a limited peripheral angular range, that is to say, on the load zone 43, which rotates together with the balancing shaft 11. This means that only the roller members 21 located in the region of the load zone 43 receive the radial load 41 so that comparatively high point loads occur at these roller members 21 (or linear loads, with respect to the longitudinal extent of the balancing shaft 11 along the rotation axis A). The corresponding mechanical compression stress distributions are illustrated in FIG. 4b with the reference numeral 45.

Owing to the reduction of the rigidity of the respective longitudinal bearing portion 25 of the balancing shaft 11 by way of the recesses 31, 31', 31" which are provided adjacent thereto, in accordance with the embodiments explained above, the load zone 43 is increased in the peripheral direction. The radial load 41, therefore, can thereby be distributed over a greater peripheral angular range and accordingly over a larger number of roller members 21 than illustrated in FIG. 4b. The point load between the balancing shaft 11 and the individual roller member 21 is consequently reduced.

Naturally, modifications of the embodiments illustrated are possible. For example, the recesses 31, 31', 31" illustrated may be arranged closer to the roller members 21 in an axial direction or may, however, also be further apart from them than is illustrated in FIGS. 1a to 3c. It is also possible for one or more recesses 31, 31', 31" to be provided at only one end of a longitudinal bearing portion 25. For example, a corresponding recess 31 may also be provided for the roller bearing 27 in accordance with FIG. 1a at the side facing the adjacent balancing weight 13.

LIST OF REFERENCE NUMERALS

11 Balancing shaft
13 Balancing weight
15 Drive wheel
17 Housing
19 Roller bearing
21 Roller member
23 Outer bearing ring
25 Longitudinal bearing portion
27 Roller bearing
29 Roller bearing
31, 31', 31" Recess
41 Radial load 43 Load zone
45 Compression stress distribution
A Axis of rotation

What is claimed is:

1. A mass balancing unit comprising:
a hollow balancing shaft having a longitudinal portion forming an inner bearing ring, and at least one recess configured to reduce the rigidity of the longitudinal portion in a radial direction;
at least one balancing weight provided on the balancing shaft; and
at least one roller bearing having an outer bearing ring and a plurality of roller members received between the outer bearing ring and the longitudinal portion of the balancing shaft,
wherein the at least one recess has a slot which extends in a peripheral direction of the balancing shaft.

2. The mass balancing unit of claim 1, wherein the at least one recess is arranged adjacent to the longitudinal portion of the balancing shaft.

3. The mass balancing unit of claim 1, wherein the at least one recess extends over a limited peripheral angular range of the balancing shaft.

4. The mass balancing unit of claim 3, wherein the limited peripheral angular range is in a range between 90° and 180°.

5. The mass balancing unit of claim 1, wherein an orientation of the at least one recess corresponds to an orientation of the balancing weight.

6. The mass balancing unit of claim 1, wherein the at least one recess is configured to form a through-opening in a wall of the hollow balancing shaft.

7. The mass balancing unit of claim 1, wherein the at least one recess is configured to form a recess in the surface of the balancing shaft.

8. The mass balancing unit of claim 1, wherein the balancing shaft has at least one recess at each of the two ends of the longitudinal portion.

9. The mass balancing unit of claim 1, wherein the roller bearing comprises a needle bearing.

10. A mass balancing unit comprising:
a shaft having a longitudinal portion forming an inner bearing ring, and recesses arranged adjacent to the longitudinal portion and configured to reduce the rigidity of the longitudinal portion in a radial direction;
balancing weights provided on the shaft; and
bearings each having an outer bearing ring and roller members received between the respective outer bearing ring and the longitudinal portion of the shaft,
wherein each recess has a plurality of holes distributed in a peripheral direction of the shaft.

11. The mass balancing unit of claim 10, wherein the each recess extends over a limited peripheral angular range of the shaft.

12. The mass balancing unit of claim 11, wherein the limited peripheral angular range is in a range between 90° and 180°.

13. The mass balancing unit of claim 10, wherein an orientation of each recess corresponds to an orientation of the balancing weight.

14. The mass balancing unit of claim 10, wherein each recess is configured to form a through-opening in a wall of the shaft.

15. The mass balancing unit of claim 10, wherein each bearing comprises a needle bearing.

16. A mass balancing unit comprising:
a shaft having a longitudinal portion forming an inner bearing ring, and recesses arranged adjacent to the longitudinal portion to reduce rigidity of the longitudinal portion in a radial direction;
balancing weights on the shaft; and
bearings each having an outer bearing ring and roller members received between the respective outer bearing ring and the longitudinal portion of the shaft,
wherein each recess is to form a recess in the surface of the shaft.

* * * * *